United States Patent
Ishikawa (10) Patent No.: US 7,260,030 B2
(45) Date of Patent: Aug. 21, 2007

(54) OPTICAL DISK APPARATUS AND PICKUP CONTROL UNIT/METHOD

(75) Inventor: Ryoichi Ishikawa, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 575 days.

(21) Appl. No.: 10/607,305

(22) Filed: Jun. 27, 2003

(65) Prior Publication Data

US 2004/0027936 A1 Feb. 12, 2004

(30) Foreign Application Priority Data

Jun. 28, 2002 (JP) .............................. 2002-190065

(51) Int. Cl.
*G11B 7/00* (2006.01)
(52) U.S. Cl. .................................. 369/44.27
(58) Field of Classification Search ............. 369/44.27
See application file for complete search history.

(56) References Cited

U.S. PATENT DOCUMENTS 5,146,442 A * 9/1992 Shikichi .................. 369/44.29
6,711,103 B2 * 3/2004 Ueki ........................ 369/44.27
2002/0051410 A1 5/2002 Okajima
2002/0150005 A1 * 10/2002 Nishiuchi ................ 369/44.29

FOREIGN PATENT DOCUMENTS

WO 00/42608 7/2000

OTHER PUBLICATIONS

Chinese Office Action dated MAr. 30, 2007 with English Translation thereof.

* cited by examiner

Primary Examiner—Thang V. Tran
Assistant Examiner—Van T. Pham
(74) Attorney, Agent, or Firm—McDermott Will & Emery LLP (57) ABSTRACT

In an optical disk apparatus, when a focus deviation occurs, amplitude driving of a pickup is performed for focus pull-in immediately without a waiting time. The amplitude driving is performed with a first amplitude a given number of times, and when detection of a focusing point fails, amplitude driving with a second amplitude larger than the first amplitude is performed.

3 Claims, 8 Drawing Sheets

OPTICAL DISK APPARATUS AND PICKUP CONTROL UNIT/METHOD

BACKGROUND OF THE INVENTION

The present invention relates to an optical disk apparatus such as a portable CD player. In particular, the present invention belongs to a technology related to pull-in operation performed at an occurrence of a focus deviation.

Figure 7:
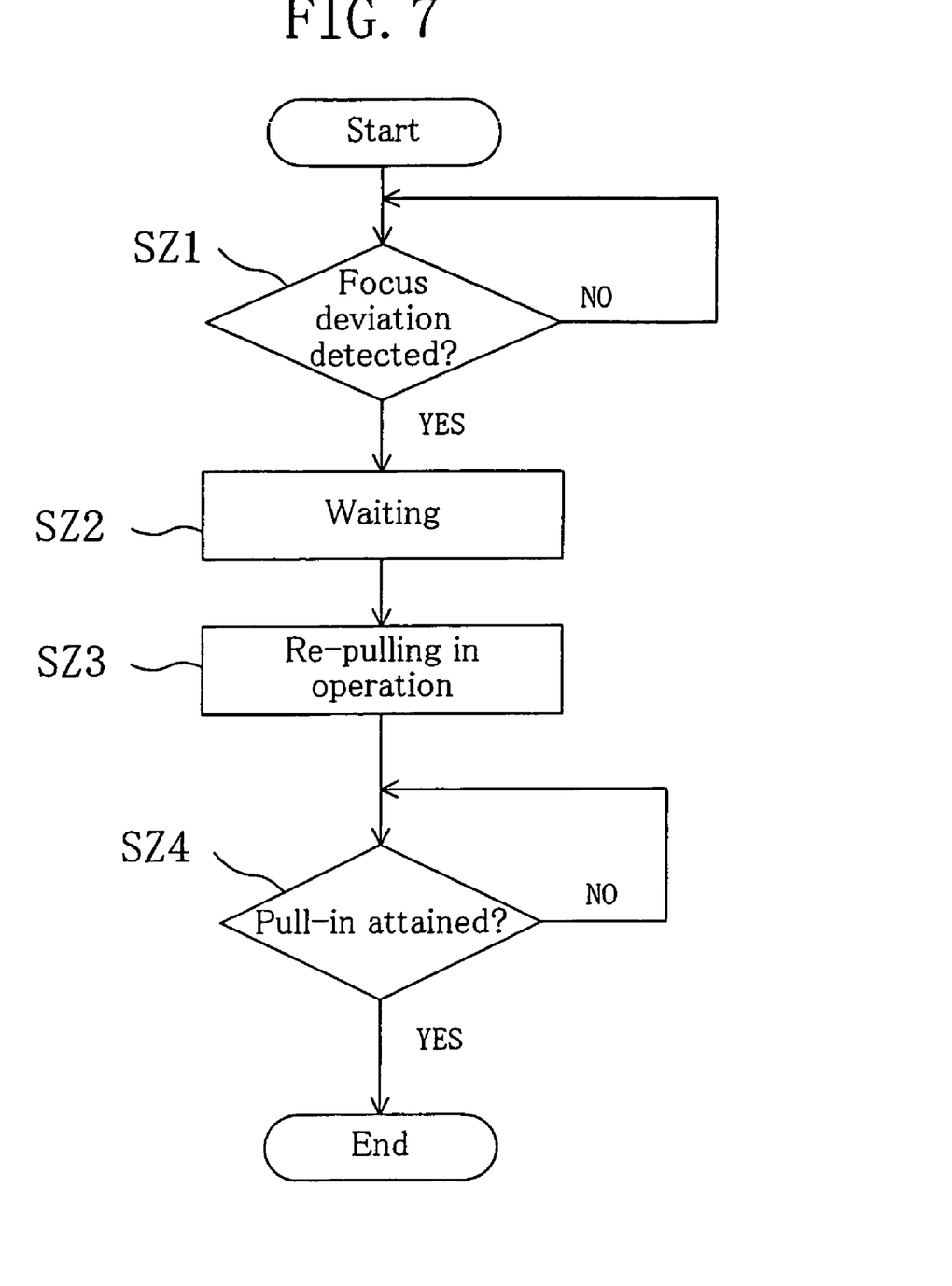
FIG. 7 is a flowchart showing a conventional focus pull-in method.
Figure 8:
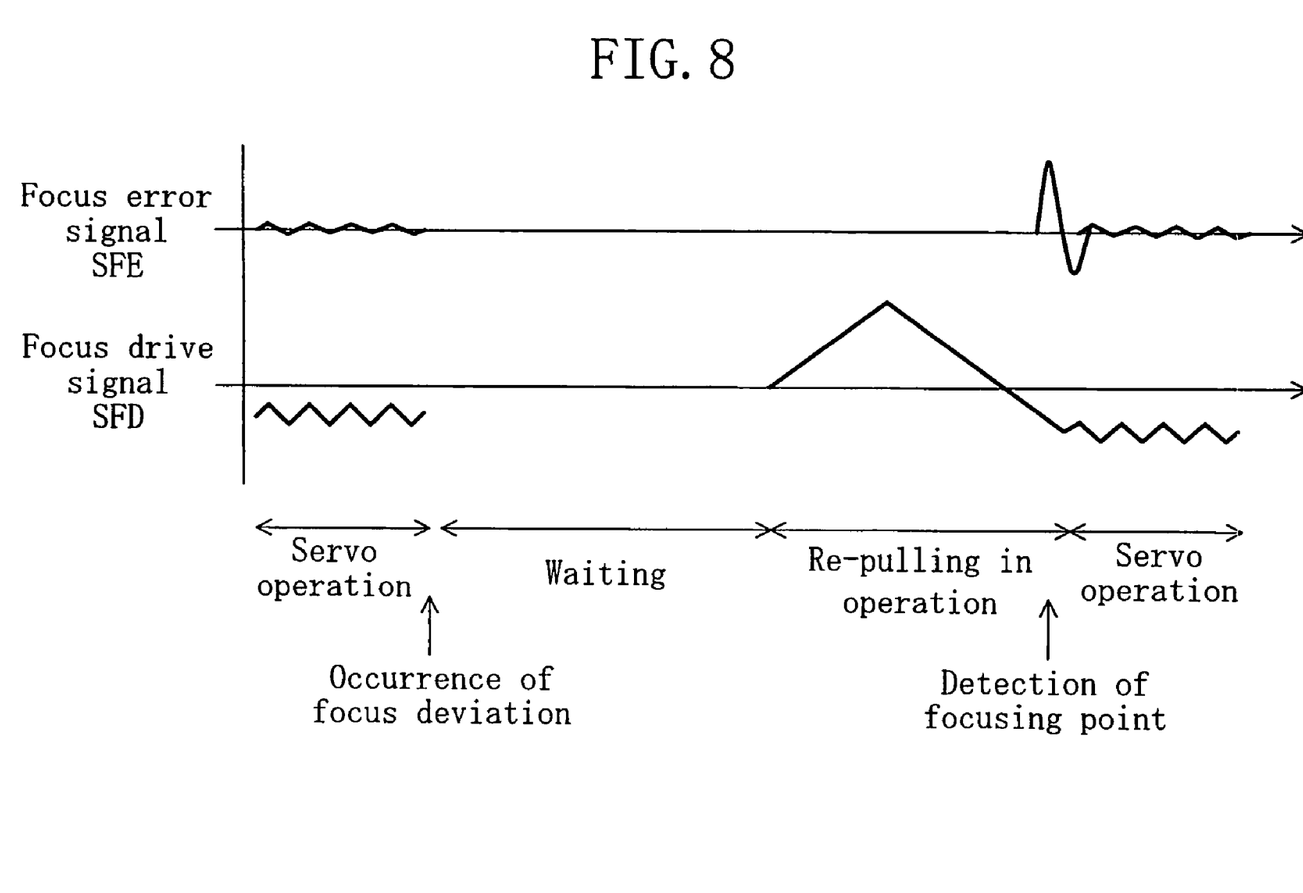
FIG. 8 is a timing chart showing an example of the conventional pull-in operation.

FIG. 7 is a flowchart showing a conventional focus pull-in method, and FIG. 8 is a timing chart showing conventional focus operation. As shown in FIGS. 7 and 8, when a focus deviation is detected (YES in SZ1), a predetermined waiting time is first provided (SZ2) to wait for a spring supporting a lens of a pickup to stop vibrating, and then pull-in operation of jogging the pickup vertically at a fixed frequency is performed to search for a focusing point between the pickup and the disk (SZ3). A focus error is detected only near the focusing point. Therefore, detection of the focusing point is confirmed by generation of a focus error signal, and then servo operation is resumed. By operating in this way, focus pull-in is completed.

Problem to be Solved by the Invention

In recent years, manufacturers of portable CD players, for example, are active in development of joggable models free from skipping during jogging. Conventional portable CD players are equipped with a shockproof function of temporarily storing reproduced data. However, in a situation like jogging in which vibration is given at a fixed period, such a shockproof function will be of no use unless the time from a skip until recovery is sped up because a next skip will occur before reproduced data is stored, resulting in occurrence of an interruption.

Therefore, it is very important to perform focus pull-in swiftly once a focus deviation occurs, to ensure that new reproduced data can be stored before reproduced data stored in a memory is read out. In other words, one of requisites for implementing a joggable model is speeding up the focus pull-in.

SUMMARY OF THE INVENTION

An object of the present invention is providing an optical disk apparatus in which when a focus deviation occurs, focus pull-in can be executed at a speed higher than conventionally attained.

Specifically, the present invention is directed to an optical disk apparatus including: a pickup; and a pull-in portion for performing pull-in operation for detecting a focusing point when a focus deviation occurs, wherein the pull-in portion performs amplitude driving of the pickup immediately after detection of a focus deviation without providing a waiting time.

According to the invention described above, in the pull-in operation, amplitude driving of the pickup is performed with no waiting time provided from detection of a focus deviation. This enables detection of a focusing point in a shorter time than the conventional method providing a waiting time, and thus enables high-speed focus pull-in.

Alternatively, the present invention is directed to an optical disk apparatus including: a pickup; and a pull-in portion for performing pull-in operation for detecting a focusing point when a focus deviation occurs, wherein, as the pull-in operation, the pull-in portion performs amplitude driving of the pickup with a first amplitude a given number of times, and, when the amplitude driving fails to detect a focusing point, performs amplitude driving of the pickup with a second amplitude larger than the first amplitude.

According to the invention described above, in the pull-in operation, amplitude driving of the pickup with a first amplitude is performed a given number of times, and when detection of a focusing point fails, amplitude driving with a second amplitude larger than the first amplitude is performed. When a focus deviation occurs, the focusing point will be near the position of the pickup with high possibility. Therefore, the probability of succeeding in detection of the focusing point is sufficiently high even when the first amplitude is set comparatively small. The amplitude value may be widened when detection of the focusing point in the first amplitude driving fails. In this way, the time required for focus re-pulling in can be shortened on average. That is, high-speed focus pull-in can be achieved.

Alternatively, the present invention is directed to an optical disk apparatus including: a pickup; and a pull-in portion for performing pull-in operation for detecting a focusing point when a focus deviation occurs, wherein, as the pull-in operation, the pull-in portion performs amplitude driving of the pickup with a first swing set in a direction opposite to an own-weight hanging direction of a lens of the pickup arising if the optical disk apparatus is put in an upright position.

According to the invention described above, in amplitude driving of the pickup, the direction of the first swing is set opposite to the own-weight hanging direction. The focusing point will exist on the side of the lens opposite to the side of the own-weight hanging of the lens with high possibility. Therefore, the focusing point can be detected in a shorter time, and thus high-speed focus pull-in can be attained.

Alternatively, the present invention is directed to an optical disk apparatus including: a pickup; and a pull-in portion for performing pull-in operation for detecting a focusing point when a focus deviation occurs, wherein, as the pull-in operation, the pull-in portion estimates on which side of the current position of the pickup the focusing point is located from a past focusing error signal, and setting the direction of a first swing toward the estimated side, performs amplitude driving of the pickup.

According to the invention described above, the direction of the first swing in the amplitude driving of the pickup is set toward the side on which the probability of existence of the focusing point is high. Therefore, high-speed focus re-pulling in can be attained.

DESCRIPTION OF THE PREFERRED EMBODIMENTS

Hereinafter, a preferred embodiment of the present invention will be described with reference to the accompanying drawings.

Figure 1:
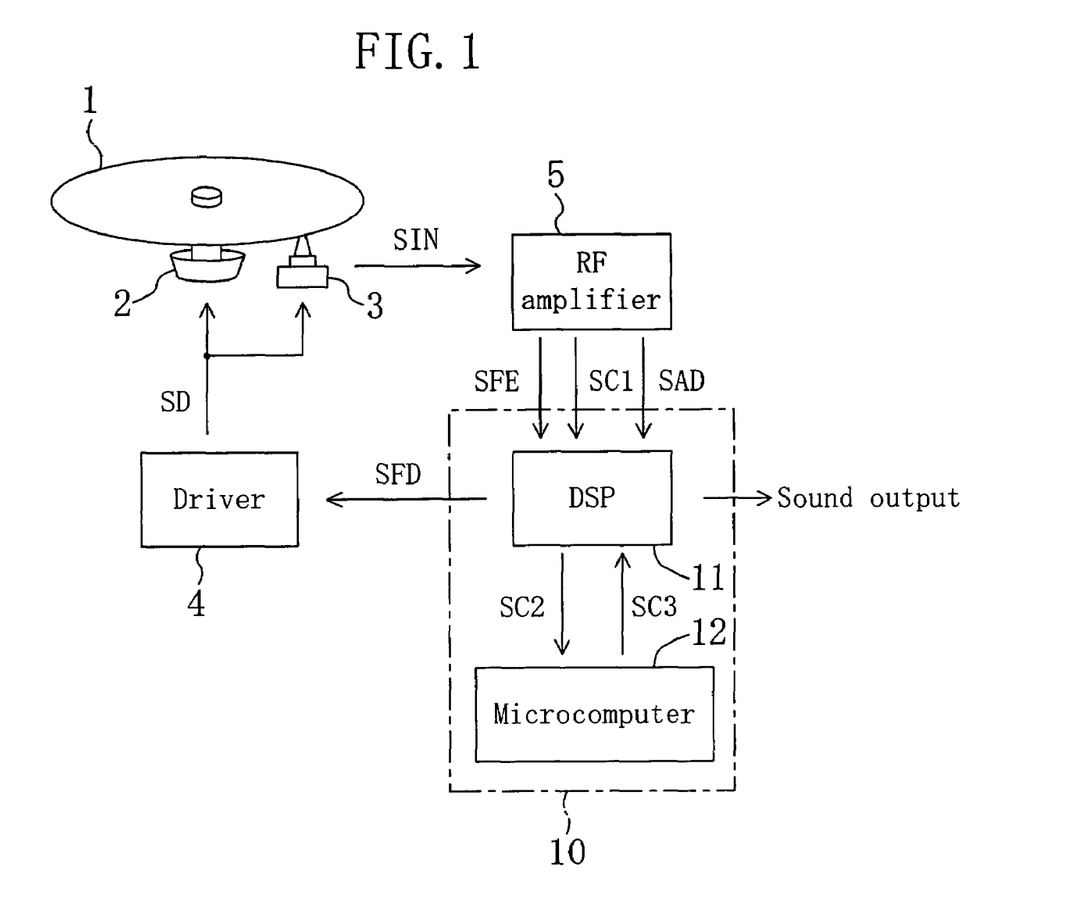
FIG. 1 is a view functionally illustrating an internal configuration of a general optical disk apparatus.

FIG. 1 is a view functionally illustrating an internal configuration of a general optical disk apparatus. Referring to FIG. 1, the optical disk apparatus includes a motor 2 for rotating an optical disk 1, a pickup 3, a driver 4 for driving the motor 2 and the pickup 3 with a driving signal SD, and a RF amplifier 5 for amplifying a signal SIN output from the pickup 3. The RF amplifier 5 outputs an audio signal SAD, a focus error signal SFE indicating the distance between the pickup 3 and a focusing point, and a first control signal SC1 indicating the state of the drive system detected from the signal SIN.

The optical disk apparatus also includes an LSI 10 serving as a pickup control unit, which includes a DSP 11 and a microcomputer 12. The DSP 11 receives the audio signal SAD and outputs sound. The DSP 11 also exchanges control signals SC2 and SC3 with the microcomputer 12, to provide a focus drive signal SFD for driving the pickup 3 vertically under control of the microcomputer 12. The driver 4 drives the pickup 3 according to the focus drive signal SFD. The driver 4, the DSP 11 and the microcomputer 12 constitute a pull-in portion.

Figure 2:
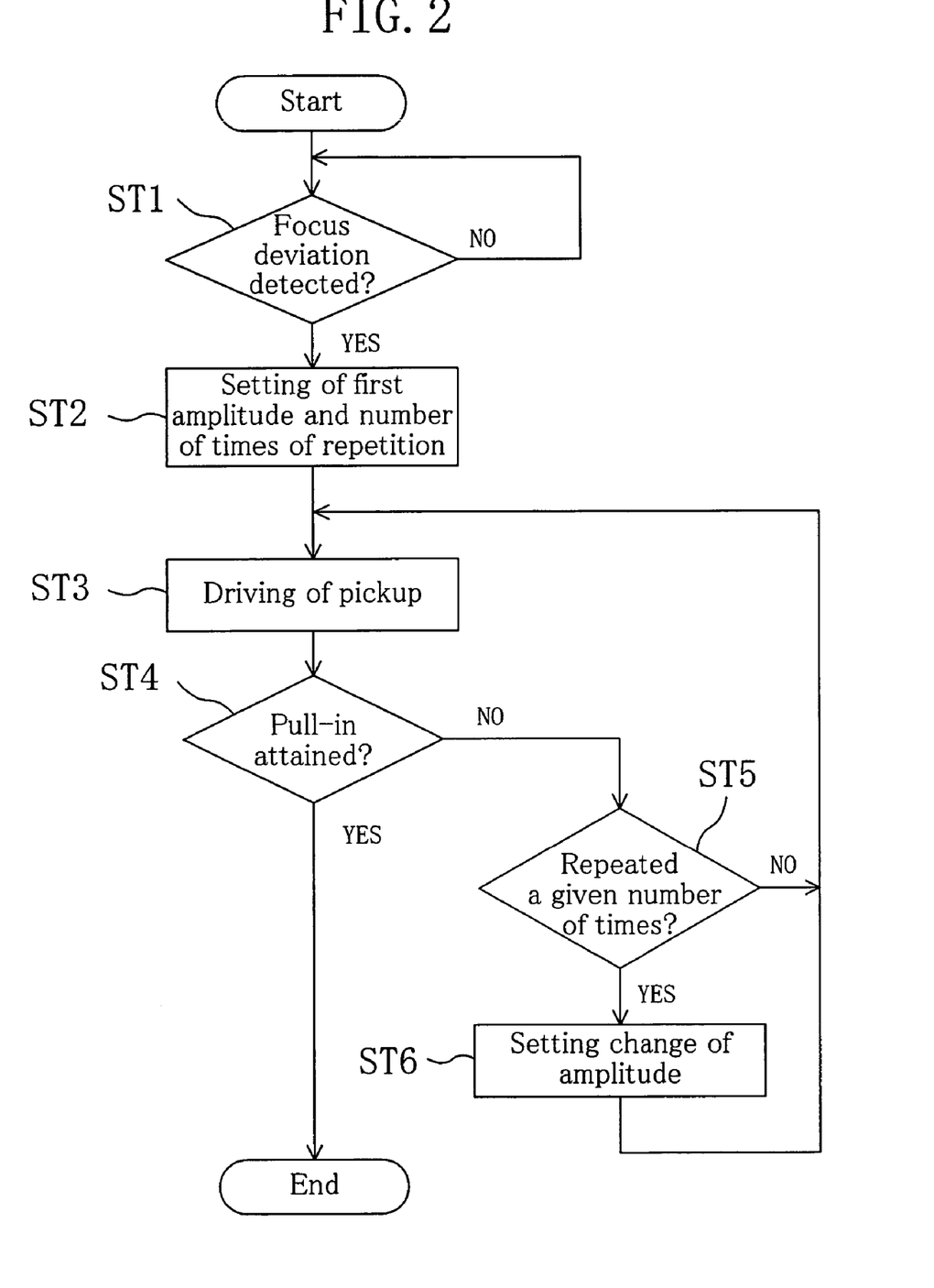
FIG. 2 is a flowchart showing a focus pull-in method in an embodiment of the present invention.

FIG. 2 is a flowchart showing a pull-in method in this embodiment. Referring to FIG. 2, first, when a focus deviation occurs, the RF amplifier 5 detects the focus deviation from the signal SIN output from the pickup 3. The RF amplifier 5 then notifies the DSP 11 of the occurrence of the focus deviation by means of the first control signal SC1 (YES in ST1).

The DSP 11 then notifies the microcomputer 12 of the occurrence of the focus deviation by means of the second control signal SC2. The microcomputer 12 sets a first amplitude value and the number of times of repetition, and instructs the DSP 11 to execute pull-in operation under these settings by means of the third control signal SC3 (ST2). With the instruction from the microcomputer 12, the DSP 11 outputs the focus drive signal SFD to the driver 4 so that the driver 4 performs amplitude driving of the pickup 3 with the first amplitude value (ST3). If the focus pull-in is attained by this driving (YES in ST4), the process is terminated.

If the focus pull-in is not attained, the amplitude driving is repeated for the set number of times. If the focus pull-in fails to be attained after the repetition of the set number of times (YES in ST5), the microcomputer 12 sets a second amplitude value larger than the first amplitude value, and instructs the DSP 11 to execute pull-in operation with this new value by means of the third control signal SC3 (ST6). With the instruction from the microcomputer 12, the DSP 11 outputs the focus drive signal SFD to the driver 4 so that the driver 4 drives the pickup 3 with the second amplitude value (ST3). If the focus pull-in is attained by this driving (YES in ST4), the process is terminated. If the focus pull-in yet fails to be attained, processing as described above is performed with a larger amplitude value.

Figure 3:
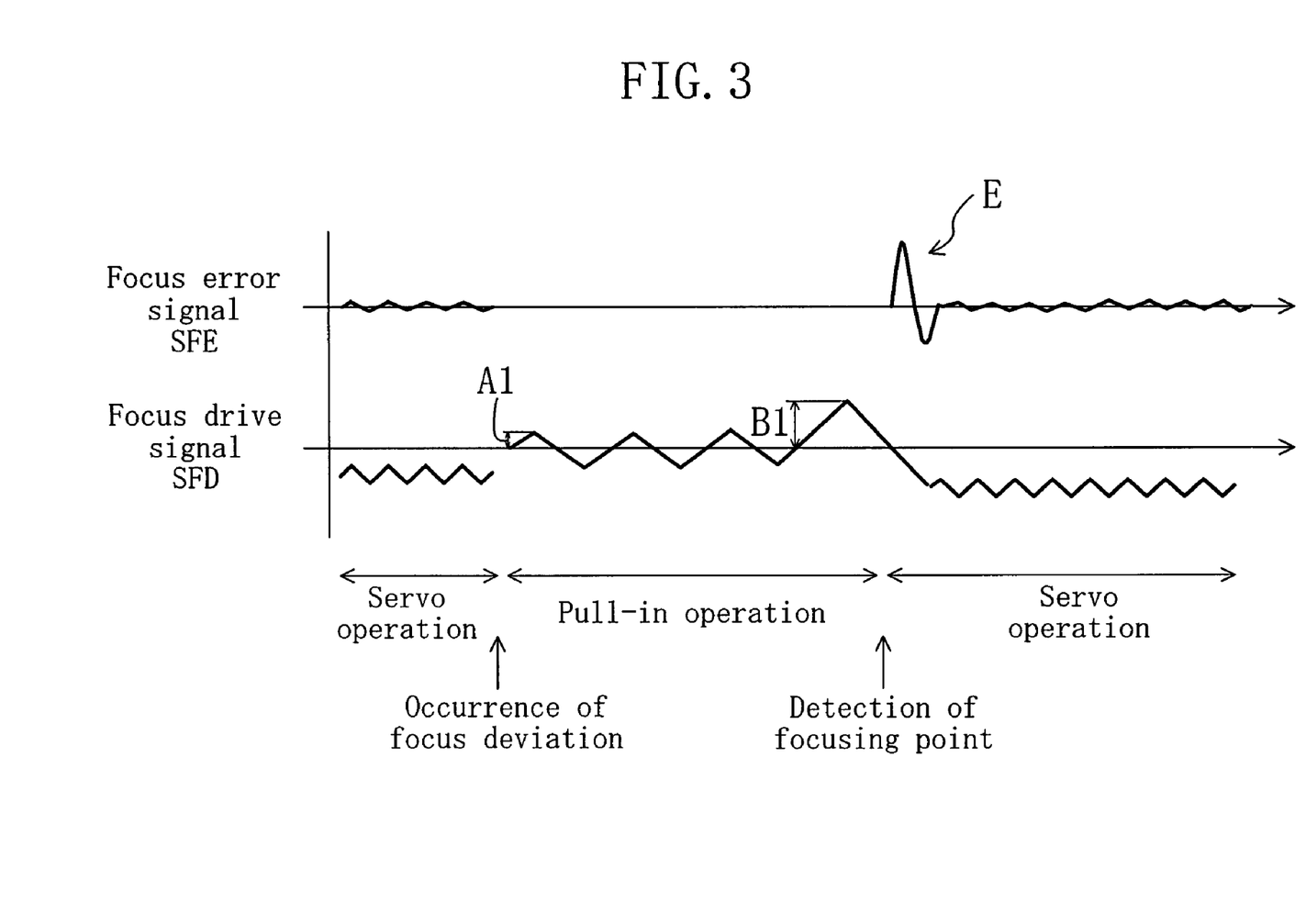
FIG. 3 is a timing chart showing an example of the pull-in operation in the embodiment of the present invention.

FIG. 3 is a timing chart showing an example of the pull-in operation in this embodiment. Referring to FIG. 3, during servo operation, both the focus error signal SFE and the focus drive signal SFD minutely fluctuate in the vicinity of respective fixed values. Once a focus deviation occurs, the focusing point must be detected to resume the servo operation. To detect the focusing point, a triangular wave is output as the focus drive signal SFD, so that the pickup 3 is subjected to vertical amplitude driving with the triangular wave.

One feature of this embodiment is to perform amplitude driving of the pickup 3 immediately after detection of a focus deviation without a waiting time. Conventionally, a waiting time was provided for the following reason. In most cases, a focus deviation occurs due to vibration given to the optical disk apparatus. Considering that a spring supporting a lens of the pickup 3 might be vibrating immediately after the focus deviation, a waiting time was provided to wait for the spring to stop vibrating. The vibration of the spring can be stopped in a short time by using a spring harder than that conventionally used. In this embodiment, therefore, by adopting a hard spring, the pickup 3 can be amplitude-driven immediately without a waiting time, and in this way, the focus pull-in operation can be attained in a short time.

Note that as used herein the wording "immediately" indicates a lapse of time of 4 ms or less, preferably, about 100 µs. A microcomputer performs task processing in an actual apparatus. A signal for time indication is output every 13.8 ms, for example, and this timing is shortened to a half for double-speed drive and to one-third for triple-speed drive. Since each task is configured to terminate within this timing, it is normally executed within about 4.4 ms. Therefore, even when "immediate" execution is attempted, it may take about 4 ms before the execution in some cases under the control of the microcomputer. To state differently, if it takes a time exceeding 4 ms, it is presumed that a waiting time is intentionally provided.

In this embodiment, the amplitude for the first amplitude driving of the pickup 3 is set at a comparatively small value. If detection of a focusing point fails after repeating the first amplitude driving a predetermined number of times, the amplitude value is increased and the amplitude driving of the pickup 3 is performed with the increased amplitude. The reason for this processing is as follows. It is presumed that at the start of occurrence of a focus deviation, the pickup 3 will be somewhere near the focusing point with high possibility. Therefore, it is expected that the focusing point can be detected with high probability even when the first amplitude is set at a comparatively small value.

The amplitude value is increased only when detection of the focusing point fails after repeating the first amplitude driving a predetermined number of times. Therefore, the time required for focus re-pulling in can be shortened on average without causing a pull-in error unnecessarily. In the example of FIG. 3, the number of times of repetition was set at three. After failure of detection of the focusing point by three-time repetition of the amplitude driving with the first amplitude A1, amplitude driving with the second amplitude B1 is started, and the focusing point is detected during this driving. Detection of the focusing point is confirmed by a large swing (E) of the focus error signal SFE that has been kept in the zero level.

Once detection of the focusing point is confirmed, re-pulling in is executed by use of the focus error signal SFE. With success of the re-pulling in, the servo operation is resumed, in which both the focus error signal SFE and the focus drive signal SFD start minute fluctuation in the vicinity of respective fixed values.

Figure 4:
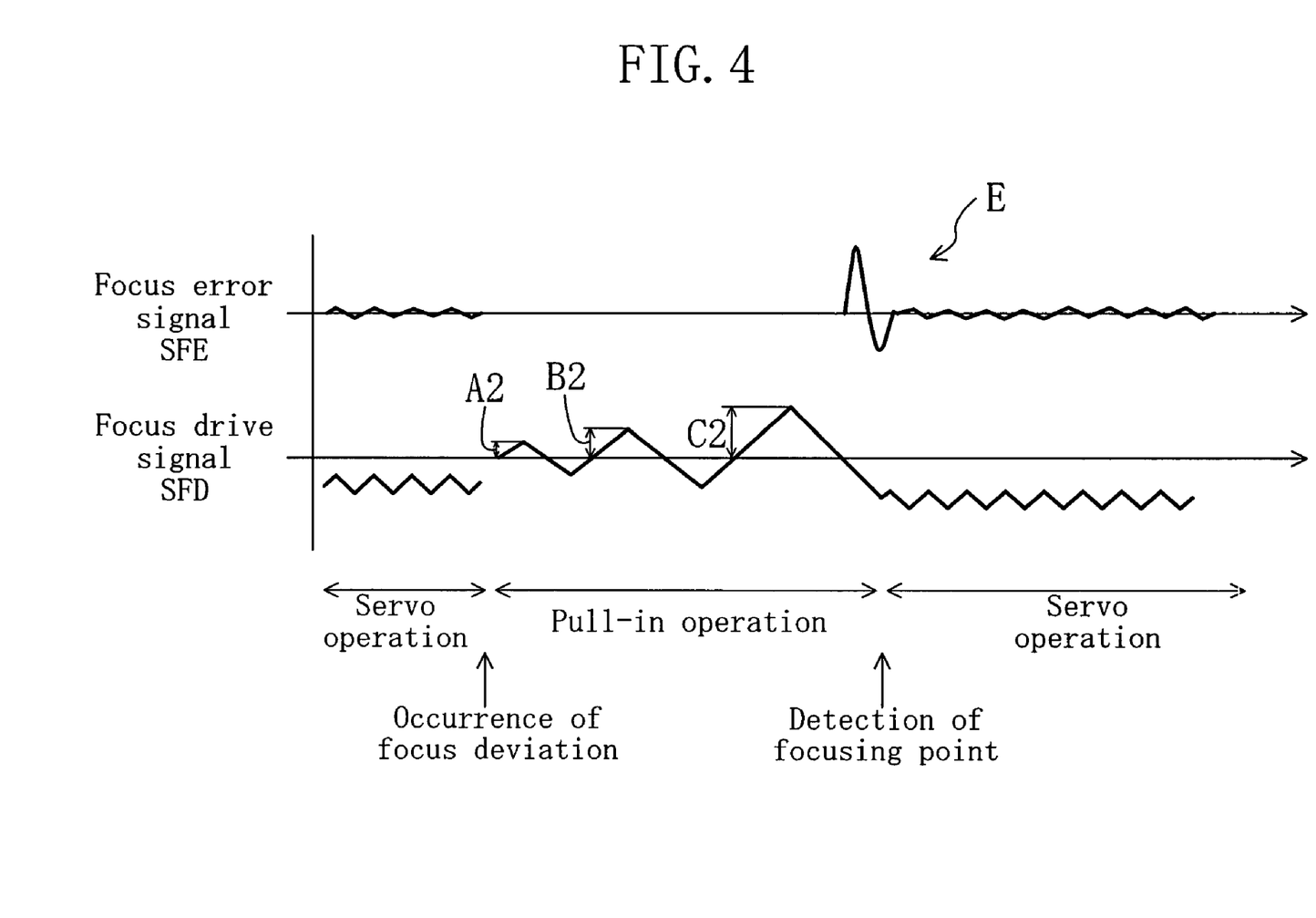
FIG. 4 is a timing chart showing another example of the pull-in operation in the embodiment of the present invention.

FIG. 4 is a timing chart showing another example of the pull-in operation in this embodiment. In the example of FIG. 4, the number of times of repetition is set at one. After failure of detection of the focusing point with the first amplitude A2 and then that with the second amplitude B2, the third amplitude C2 of a further larger value is set, and the focusing point is detected during this driving.

The number of times of repetition with the same amplitude is not limited to three and one, but may be two, for example. Note however that one time is enough when the accuracy of detection of the focusing point is sufficiently high.

It is not rare that a portable CD player is put in an upright position. Therefore, the first amplitude and the direction of the first swing in the amplitude driving of the pickup 3 may be set considering upright placement of the optical disk apparatus. This will be described as follows.

Figure 5A:
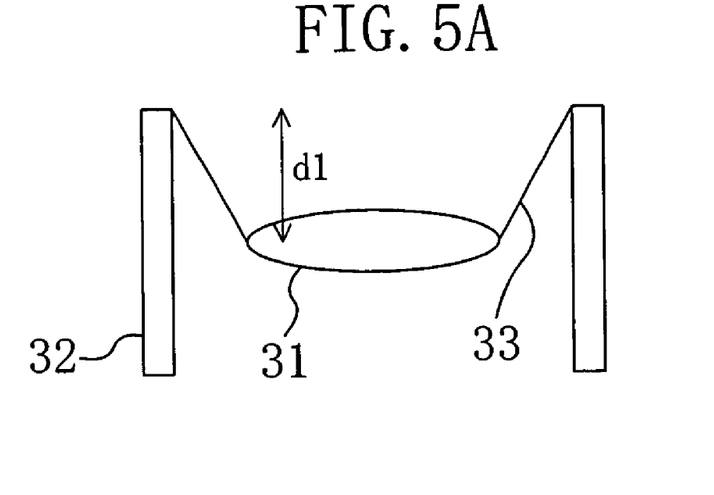
FIGS. 5A and 5B are diagrammatic views of pickups using a soft spring.
Figure 5B:
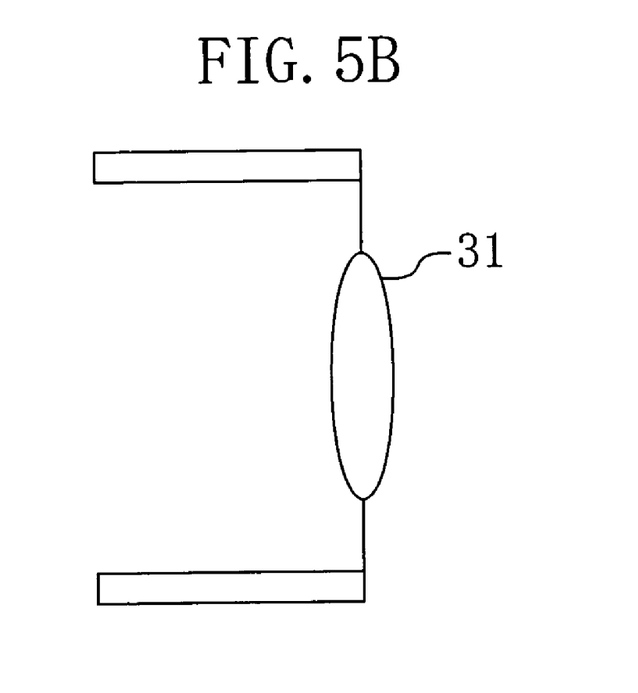
Figure 6A:
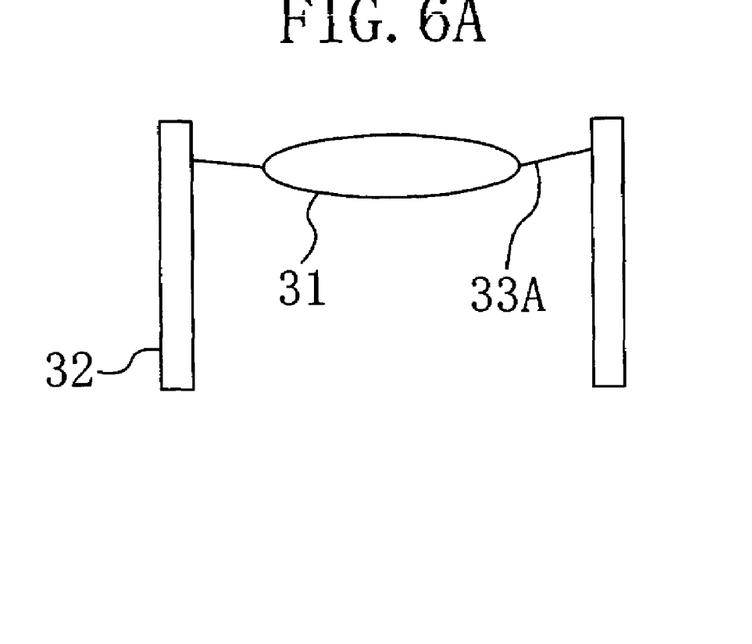
FIGS. 6A and 6B are diagrammatic views of pickups using a hard spring.
Figure 6B:
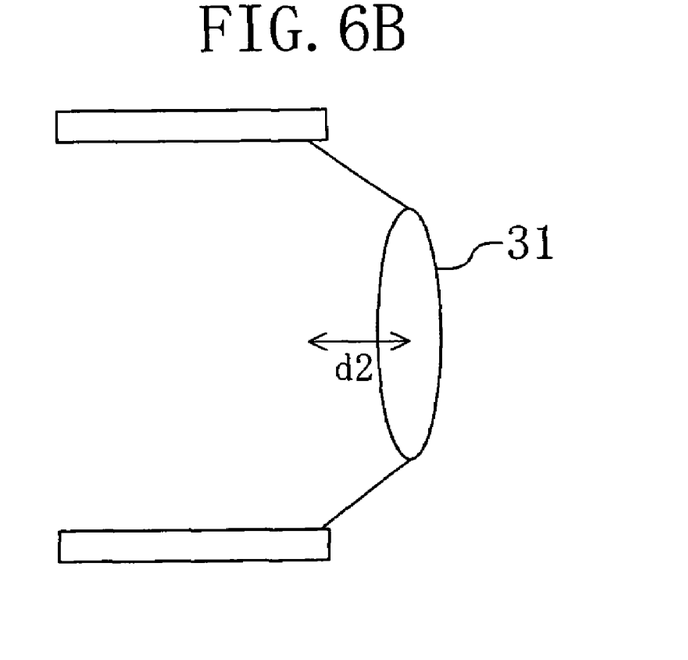

FIGS. 5A and 5B are diagrammatic views of pickups using a comparatively soft spring, and FIGS. 6A and 6B are diagrammatic views of pickups using a hard spring, where FIGS. 5A and 6A show the case of horizontal placement and FIGS. 5B and 6B show the case of upright placement. Throughout these figures, the reference numeral 31 denotes a lens, 32 denotes a side of the pickup, and 33, 33A denotes a spring. Note that in optical disk apparatuses, a pickup with a hard spring will be used in the future for attaining higher-speed reproduction and lower power consumption.

As is evident from comparison between FIGS. 5A and 5B and FIGS. 6A and 6B, in the horizontal placement of the apparatus, while the pickup with the soft spring 33 has a hanging amount of the lens 31 under its own weight, the pickup with the hard spring 33A, in which the lens 31 is suspended upwardly, has only a small own-weight hanging amount. On the contrary, in the upright placement of the apparatus, while the pickup with the soft spring 33 hardly has an own-weight hanging amount, the pickup with the hard spring 33A has an own-weight hanging amount d2 because the lens 31 protrudes outward due to the suspension with the spring 33A. In this case, if a focus deviation occurs, the lens 31 protrudes outward.

Therefore, in the case of use of a pickup as shown in FIGS. 6A and 6B, the first amplitude for the first amplitude driving may be set at a value equal to or more than the own-weight hanging amount d2 of the lens 31 arising when the optical disk apparatus is put in an upright position. By this setting, the possibility of detecting the focusing point in the first amplitude driving can be sufficiently enhanced. In this way, focus pull-in can be attained at high speed on average.

Also, in the case of use of a pickup with a hard spring as shown in FIGS. 6A and 6B, in which the lens 31 protrudes in the own-weight hanging direction or outwardly when the optical disk apparatus is put in an upright position, the focusing point will exist on the side of the lens 31 opposite to the side of the own-weight hanging with high possibility. Therefore, it is considered that the focusing point can be detected in a shorter time by setting the direction of the first swing in the amplitude driving of the pickup opposite to the own-weight hanging direction. By this setting, the focus pull-in can be attained at high speed on average.

Also, it is considered that at occurrence of a focus deviation, the amplitude of the focus error signal SFE is large in the direction in which the focus is deviated. Based on this consideration, it is possible to set the first swing in the amplitude driving of the pickup in the direction in which the focusing point will exist with high probability.

More specifically, the DSP 11 is configured to hold the focus error signal SFE by N samples (N is an arbitrary natural number) at all times. When detecting a focus deviation, the DSP 11 checks the polarity of the focus error signal SFE for the past N samples held, to detect whether the pickup 3 is deviated from the focusing point upward or downward. In other words, the DSP 11 estimates on which side of the current position of the pickup 3 the focusing point is located, and setting the direction of the first swing toward this estimated side, performs amplitude driving of the pickup 3. In this way, high-speed focus pull-in can be realized.

As described above, according to the present invention, high-speed focus pull-in can be realized at occurrence of a focus deviation. This enables realization of a joggable model for a portable CD player, for example.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. An optical disk apparatus comprising;
   a pickup; and
   a pull-in portion for performing pull-in operation for detecting a focusing point when a focus deviation occurs,
   wherein, as the pull-in operation, the pull-in portion performs amplitude driving of the pickup with a first amplitude a given number of times, and, when the amplitude driving fails to detect a focusing point, performs amplitude driving of the pickup with a second amplitude larger than the first amplitude,
   wherein the first amplitude is set at a value equal to or more than an own-weight hanging amount of a lens of the pickup arising if the optical disk apparatus is put in an upright position,
   wherein the pull-in portion performs amplitude driving of the pickup with the first amplitude, with a first swing set in a direction opposite to an own-weight hanging direction of a lens of the pickup rising if the optical disk apparatus is put in an upright position.

2. A control unit for controlling driving of a pickup of an optical disk apparatus,
   wherein when detecting occurrence of a focus deviation, the control unit instructs a driver of the pickup to perform amplitude driving of the pickup with a first amplitude a given number of times, and
   when finding that detection of a focusing point fails as a result of the instruction, the control unit instructs the driver to perform amplitude driving of the pickup with a second amplitude larger than the first amplitude,
   wherein the first amplitude is set at a value equal to or more than an own-weight hanging amount of a lens of the pickup arising if the optical disk apparatus is put in an upright position,
   wherein the control unit instructs the driver to perform amplitude driving of the pickup with the first amplitude, with a first swing set in a direction opposite to an own-weight hanging direction of a lens of the pickup arising if the optical disk apparatus is put in an upright position.

3. A method for controlling driving of a pickup of an optical disk apparatus, comprising the steps of:
   performing amplitude driving of the pickup with a first amplitude a given number of times when a focus deviation occurs; and performing amplitude driving of the pickup with a second amplitude larger than the first amplitude when detection of a focusing point by the amplitude driving with the first amplitude fails, wherein the first amplitude is set at a value equal to or more than an own-weight hanging amount of a lens of the pickup arising if the optical disk apparatus is put in an upright position, wherein amplitude driving of the pickup with the first amplitude is performed, with a first swing set in a direction opposite to an own-weight hanging direction of a lens of the pickup arising if the optical disk apparatus is put in an upright position.

* * * * *